Figure 5:
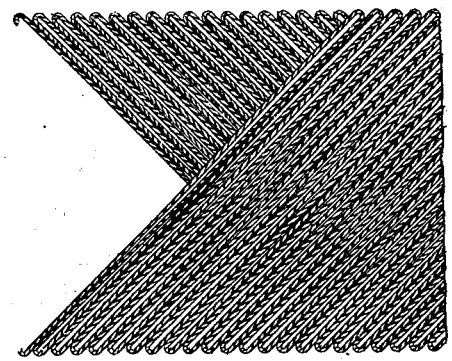

No. 662,963. Patented Dec. 4, 1900.
E. E. PRESTON & G. D. KENDRICK.
FABRIC FOR JACKETS FOR PNEUMATIC TIRES.
(Application filed June 11, 1900.)
(No Model.) 2 Sheets—Sheet 1.
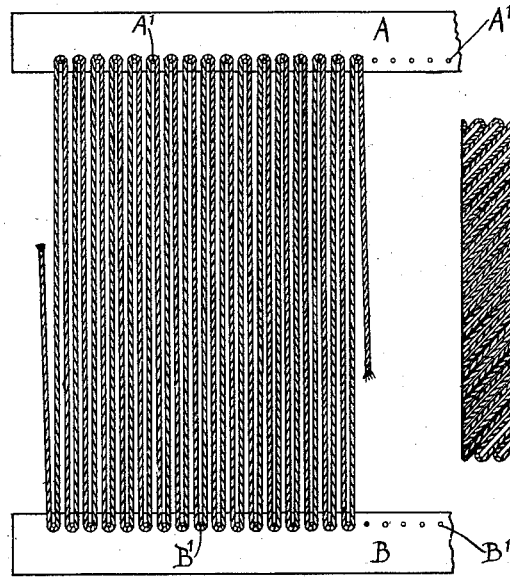
Fig. 1
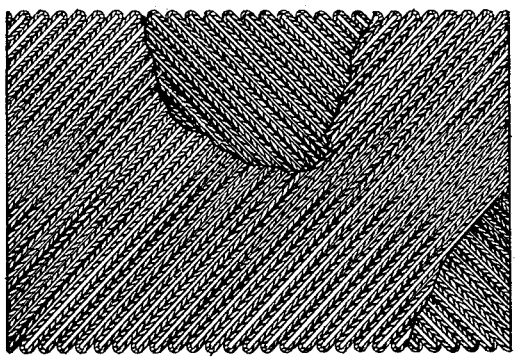
Fig. 3
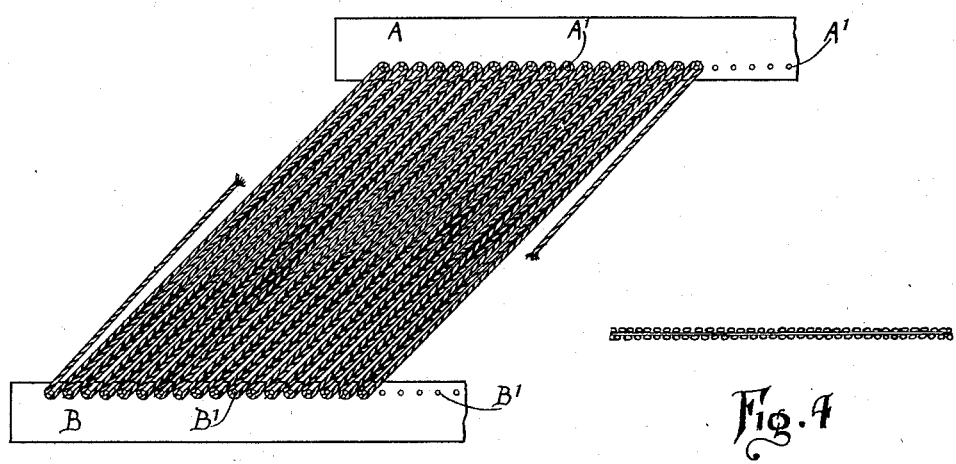
Fig. 2
Fig. 4
Witnesses
Inventors:
Edward E. Preston
George D. Kendrick
By Wm. A. Poulter, Attorney No. 662,963. Patented Dec. 4, 1900.
E. E. PRESTON & G. D. KENDRICK.
FABRIC FOR JACKETS FOR PNEUMATIC TIRES.
(Application filed June 11, 1900.)

(No Model.) 2 Sheets—Sheet 2.

UNITED STATES PATENT OFFICE.

EDWARD EVERARD PRESTON AND GEORGE DUNCAN KENDRICK, OF LEICESTER, ENGLAND, ASSIGNORS OF ONE-HALF TO TRION HORACE BAKER AND ALBERT HOLLINGWORTH, OF SAME PLACE.

FABRIC FOR JACKETS FOR PNEUMATIC TIRES.

SPECIFICATION forming part of Letters Patent No. 662,963, dated December 4, 1900.

Application filed June 11, 1900. Serial No. 19,802. (No model.)

*To all whom it may concern:*

Be it known that we, EDWARD EVERARD PRESTON and GEORGE DUNCAN KENDRICK, subjects of the Queen of Great Britain, residing at Leicester, England, have invented certain new and useful Improvements in Fabrics to be Used as Jackets for Pneumatic Tires, (for which Letters Patent have been applied for in Great Britain, Application No. 6,450, dated April 6, 1900,) of which the following is a specification.

This invention has reference to an improved fabric for pneumatic tires for cycles and other wheels, and is designed to produce an improved fabric specially applicable for use as a lining or jacket for the said tires.

The main object of the invention is to manufacture a complete fabric of the length and width required for a pneumatic tire with which such fabric is to be used and with a looped or selvaged edge, thereby avoiding the necessity of having to cut a jacket or cover for a tire out of a larger piece of fabric and obviating the attendant waste of time and of fabric which such operations necessarily involve.

The invention comprises a two-ply fabric of the required width and length, each ply of which comprises a series of parallel threads or cords of any suitable character and approximately non-extensible, formed out of a single length of thread or cord which runs alternately from one side to the other and from opposite edges of the fabric, where it is looped, bent, or doubled before returning in the opposite direction, thus forming a looped selvaged edge to the fabric. The two plies of fabric when placed together have their series of parallel threads or cords presented obliquely or at an angle the one to the other, and the two plies are united by means of india-rubber solution, with which the adjacent faces of one or each of the two plies is coated, or a thin sheet or film of plastic rubber may be interposed between the two plies of fabric, and after pressure has been applied to embed the threads in the latter the whole may be submitted to the vulcanizing process in the usual manner.

The invention will be understood from the following further description in reference to the accompanying drawings, wherein—

Figure 6:
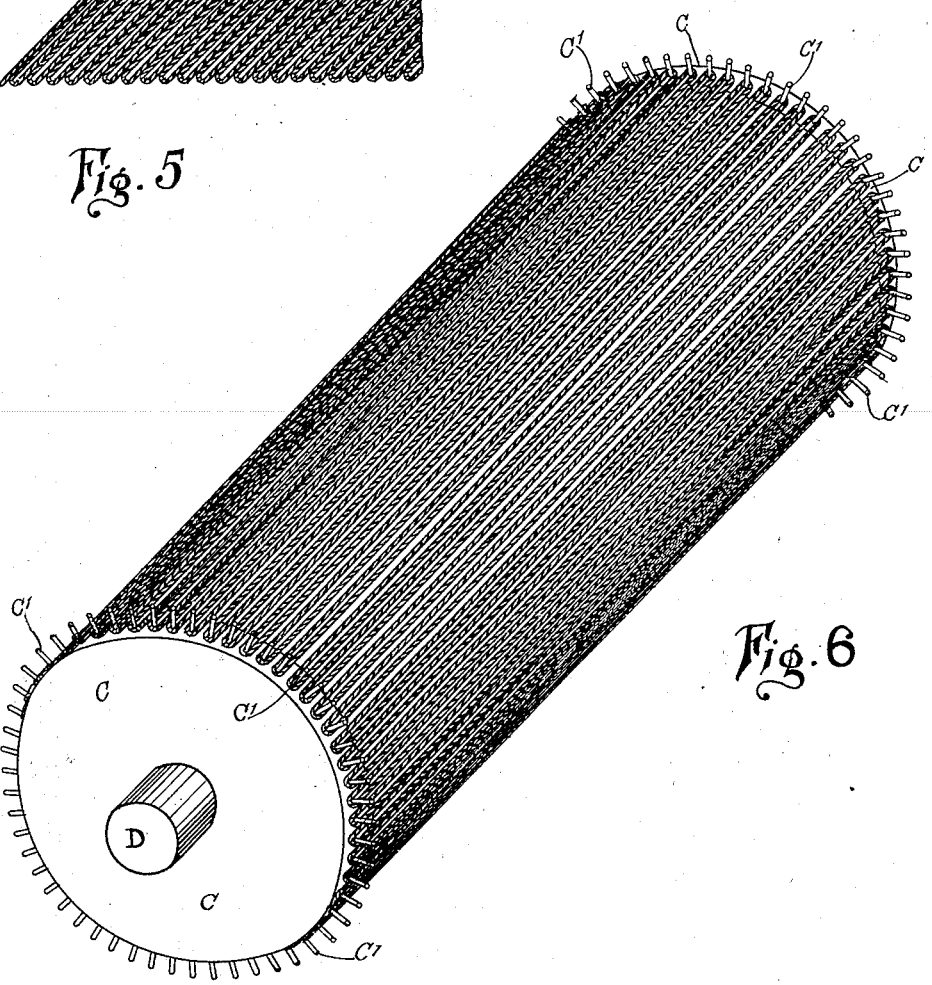

Figure 1 is a plan of a piece of fabric constructed in accordance with this invention and parts of the bars upon which the said fabric is made. Fig. 2 is a similar view with the bars moved longitudinally in opposite directions, so as to cause the threads to run in an oblique direction. Fig. 3 represents a piece of two-ply fabric. Fig. 4 is a transverse section of our improved two-ply fabric having a thin sheet or layer of rubber interposed between the two plies. Fig. 5 is a view showing how the end of one ply overlaps the other in the finished tire fabric or lining. Fig. 6 is a perspective view illustrating the manufacture of a flat endless seamless fabric.

To manufacture a fabric of the character hereinbefore described, we employ two bars A B, each provided along its face with a series of pins A' B', the said bars being fixed at a distance apart determinable according to the width of fabric or tire-lining to be produced. We then take an inextensible cord or thread and lap it around one of the pins A' on the bar A and carry it across to an opposite pin B' on the bar B and lap it around the said pin, then return the thread to the bar A, lapping it around the next adjacent pin A', then lead it again across to and around the next adjacent pin B' on the bar B, and so on, the process being repeated by carrying the thread across alternately from one bar to the other, lapping it around the next adjacent pin each time until a sufficient length of fabric has been produced to fit a predetermined tire. By this means there is produced from a single cord a one-ply fabric consisting of a series of parallel inextensible threads having a looped selvaged edge, the loops being formed by the thread bending and passing around the pins to return in the opposite direction. When a one-ply fabric has been thus formed, the two bars A B are moved lengthwise in opposite directions, thus causing the series of parallel threads to run in an oblique direction. Before the fabric is removed from the bars a coating of rubber solution may be spread over its face, which will unite the individual threads sufficiently to enable it to be removed. Another piece of fabric, also formed as hereinbefore described, may then be made and placed upon the solutioned face of the first-named piece, but with its threads running in a different direction, so that the two series of parallel threads are disposed at an angle the one to the other, as indicated in Fig. 3, and when pressure has been applied to the two layers or the plies of fabric to consolidate or compact and cause the uniting or adhesion of the two there is thereby formed a two-ply fabric, each ply consisting of a series of parallel threads with a looped or selvaged edge formed out of a single thread and each ply having its series of threads presented obliquely or at an angle to the series of threads in the other ply.

When horizontal bars are used, the two plies of fabric produced will be in straight lengths, and when the series of threads in each ply run in opposite diagonal directions the ends of the plies overlap or stand beyond one another, as shown in Fig. 5, and when the two ends of the fabric are brought together to form a complete circle or cover for the tire the said upper lap on one end is placed face downward on the under lap on the opposite end, and vice versa as regards the two remaining laps.

In the manufacture of a flat endless fabric of a predetermined diameter corresponding to that of the tire with which it is to be used there are employed two circular bars, rings, or wheels C of the same diameter, each bar being provided with a series of projecting pins C' on its periphery, around which the thread is lapped to form the looped or selvaged edge, as hereinbefore described. The two circular bars, rings, or wheels are mounted on a shaft D, the distance between the same being equivalent to the width of the tire. A single thread or cord is led across alternately from one wheel to the other and lapped around the next adjacent pin each time until the whole of the pins have been lapped, when the ends of the thread around the pins where the lapping commenced and finished, respectively, may be tied or otherwise. One of the two wheels temporarily keyed or otherwise fixed on the shaft is then partly rotated, so that the series of parallel threads may run diagonally, after which a coating of rubber solution is applied to the surface of the threads to unite them sufficiently to constitute a one-ply fabric and enable them to be removed without relative displacement.

Instead of affixing together the adjacent faces of the two plies of fabric by rubber solution a thin film or layer of sheet-rubber may be interposed between the two plies and pressure applied in any suitable manner to embed the threads in the rubber, when the whole may be vulcanized in the well-known manner.

Having now particularly described and ascertained the nature of our said invention and in what manner the same is to be performed, we declare that what we claim is—

1. A two-ply fabric, each ply of which consists of a single thread formed into a series of parallel inextensible threads with looped edges, with their adjacent faces connected as described, the series of threads in one ply disposed at an angle or presented obliquely to the series of threads in the other series substantially as and for the purpose described.

2. A fabric, consisting of two series of parallel inextensible threads, the threads in one series being at an angle with the threads in the other series, each series of threads being formed out of a single thread which runs alternately from one side to the other and from opposite edges of the fabric where it is bent or doubled before returning in the opposite direction, thereby forming a looped selvaged edge to the fabric substantially as and for the purpose described.

3. An endless flat fabric consisting of two series of parallel threads one series being disposed at an angle to the other series and each series being formed out of a single thread which runs alternately from one side of the fabric to the other in opposite directions being bent or doubled before returning so as to form a loop selvaged edge to the fabric and the ends of the single thread being connected substantially as described.

4. The process of forming a fabric of the character specified, which consists in laying a single thread in equal lengths from right to left and vice versa alternately, the thread being bent or doubled each time before returning whereby to form a looped edge, causing the series of parallel threads to run in an oblique direction, and laying another similarly-produced fabric thereon so that its series of parallel threads are disposed at an angle to the other series.

In testimony whereof we have hereunto set our hands, in the presence of two subscribing witnesses, this 28th day of May, 1900.

EDWARD EVERARD PRESTON.
GEORGE DUNCAN KENDRICK.

Witnesses:
E. N. LEWIS,
P. V. MOORE.